United States Patent [19]

Luo et al.

[11] 4,042,854

[45] Aug. 16, 1977

[54] FLAT PANEL DISPLAY DEVICE WITH INTEGRAL THIN FILM TRANSISTOR CONTROL SYSTEM

[75] Inventors: Fang-Chen Luo, Turtle Creek; Thomas P. Brody, Pittsburgh, both of Pa.

[73] Assignee: Westinghouse Electric Corporation, Pittsburgh, Pa.

[21] Appl. No.: 634,216

[22] Filed: Nov. 21, 1975

[51] Int. Cl.² .................................. H05B 33/08
[52] U.S. Cl. ........................ 315/169 TV; 313/505; 315/51; 315/169 R; 340/166 EL
[58] Field of Search ............. 315/169 R, 169 TV, 51; 313/506, 509, 498, 502, 505; 340/166 EL

[56] References Cited

U.S. PATENT DOCUMENTS

| | | | |
|---|---|---|---|
| 3,330,982 | 7/1967 | Dickson | 315/169 TV X |
| 3,379,931 | 4/1968 | Soldano | 315/169 R |
| 3,512,041 | 5/1970 | Dalmasso | 313/505 |
| 3,786,307 | 1/1974 | Robinson | 315/169 R X |
| 3,885,196 | 5/1975 | Fischer | 315/169 TV |

Primary Examiner—Eugene R. LaRoche
Attorney, Agent, or Firm—W. G. Sutcliff

[57] ABSTRACT

A large area integrated solid-state flat panel display is detailed in which thin film transistor addressing and drive circuitry is provided at each individual picture point with a display medium. The preferred display medium is an electroluminescent phosphor layer. An insulating layer of laminated photoresist is disposed over all electrical circuit elements except the electroluminescent drive electrodes.

4 Claims, 4 Drawing Figures

FLAT PANEL DISPLAY DEVICE WITH INTEGRAL THIN FILM TRANSISTOR CONTROL SYSTEM

BACKGROUND OF THE INVENTION

The present invention relates to a solid-state flat panel display device intended as a replacement for conventional cathode ray display tubes. The low cost and versatility of the cathode ray display tube has kept it as the mainstay for information display purposes. A variety of alternatives including gas discharge panels, light valve displays, and liquid crystal devices have been employed for specialized applications.

It has been apparent for some time that a solid-state flat panel display is conceptually achievable. Efforts to utilize silicon technology to this end are limited by the size limitation problems of the silicon wafer, which negates achievement of large area displays.

A recent revitalization of thin film transistor technology toward this end is evidenced by U.S. Pat. No. 3,840,695. The thin film transistor is vacuum deposited upon a substrate and the only limitation on panel size is the size of the vacuum deposition system.

A problem in designing a thin film transistor addressed and controlled display panel is achieving dense packing of thin film circuitry and display medium while making the requisite electrical connections and providing electrical isolation between portions of the circuitry and the display medium.

SUMMARY OF THE INVENTION

A large area flat panel solid-state display is provided in which thin film transistor addressing and control circuitry are integrally connected to the display medium while being electrically isolated at non-contact portions to prevent extraneous excitation. An array of spaced apart interconnected rows and columns of thin film transistor control circuitry is disposed upon a substrate. The interconnecting of the circuitry is via switching signal, information signal, and power signal bus bars which define between their intersection unit display cells which are repeated over the entire panel. An electroluminescent drive electrode is disposed on the substrate as part of each unit cell and is connected as part of each unit cell. A relatively thick laminated polymerized photoresist insulator layer is disposed over the thin film transistor circuitry and interconnecting bus bars. A layer of electroluminescent material is disposed over the entire area of the panel, and a common electrode is disposed over the electroluminescent phosphor.

DESCRIPTION OF THE PREFERRED EMBODIMENT

Figure 1:
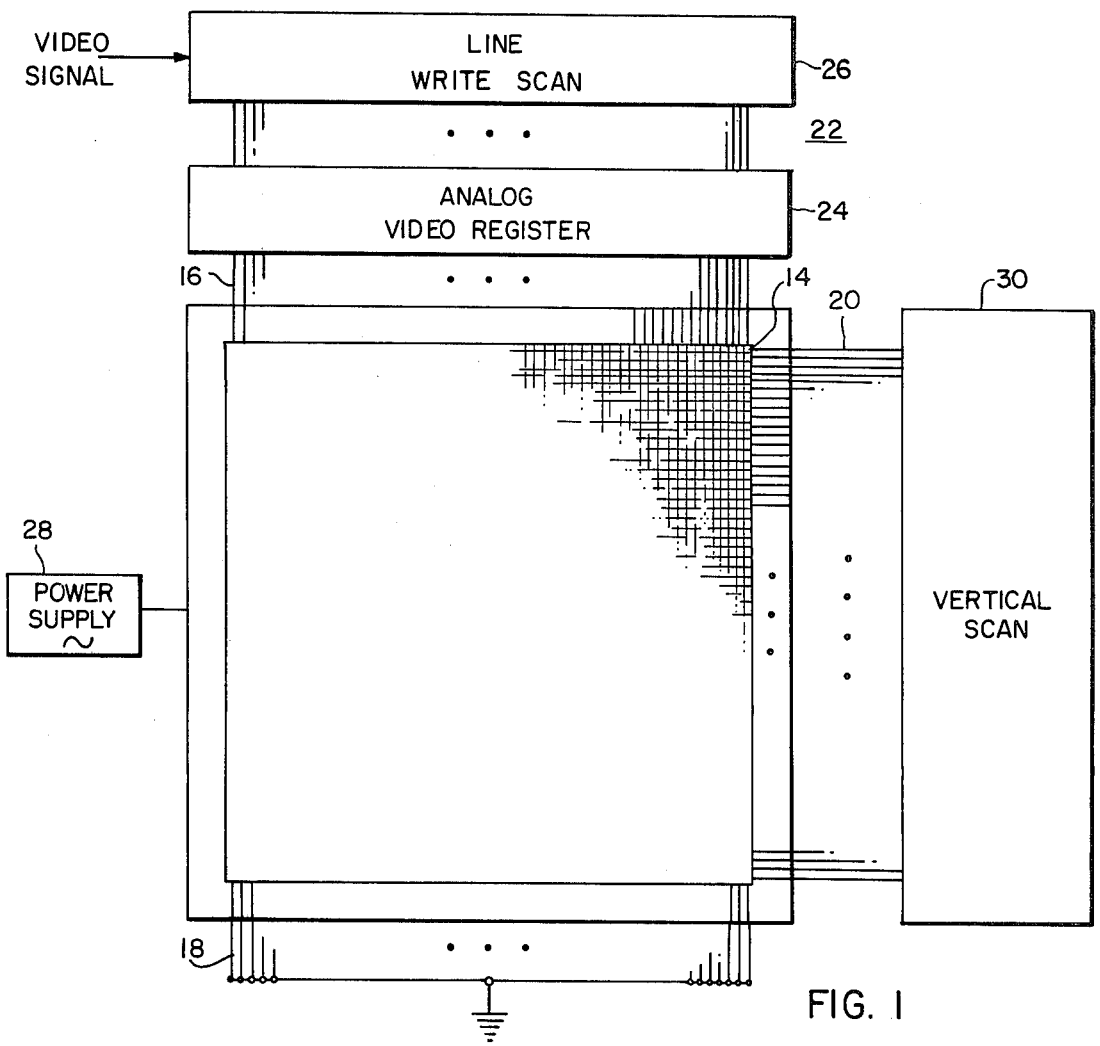
FIG. 1 is a schematic representation of the thin film transistor controlled display panel and drive system.
Figure 2:
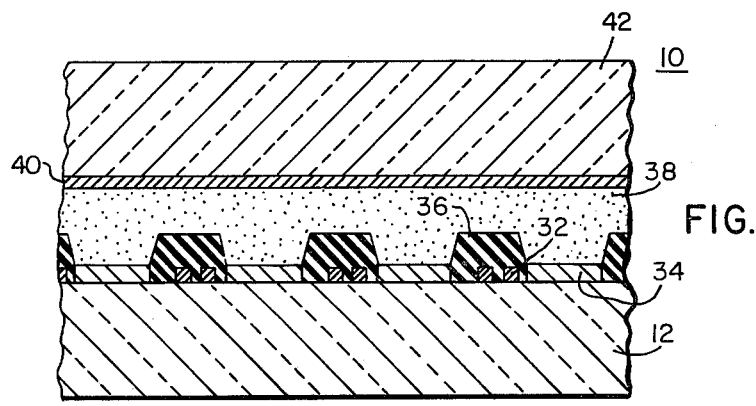
FIG. 2 is a schematic cross-sectional representation of the display panel seen in FIG. 1.

The thin film transistor controlled display panel 10 is seen in FIGS. 1 and 2. The display panel 10 is fabricated on an insulating substrate 12, which is here a planar glass plate. A matrix of rows and columns of display elements 14 is arrayed on the insulating substrate. The exact details of the display elements 14 will be described later with respect to FIGS. 3 and 4.

Each of the display elements 14 constitutes a separate video information point. The size or area of the panel is more a function of the fabricating equipment, i.e. vacuum deposition equipment, than an inherent characteristic of the panel structure. The panel which is illustrated here has been fabricated as a 6 inch by 6 inch size panel with the size of the display elements 14 such as to provide 20 line per inch resolution.

The display elements 14 are disposed between intersections of the parallel information signals buses 16, and the switching signal buses 20. The information signal buses 16 are spaced apart parallel conductors with an individual bus for each column of display elements. The power buses 18 are parallel spaced apart conductors which are also parallelly disposed relative to the information buses 16 again with one bus per column of display elements. The switching signal buses 20 are parallel spaced apart conductors which are disposed orthogonal to the information buses 16 and the power buses 18. One switching bus is provided per row of display elements.

The information signal buses 16 as seen as being fed from the top periphery of panel 10, with connection to the video signal input means 22 via individual bus connectors. The video signal input means is here shown as analog video signal register 24 and line write scan means 26 to which the video information signal is fed. The video signal input means 22 can be varied in complexity depending upon the video. For alpha-numeric information requiring only on-off operation of the individual display elements the input means 22 can be relatively simple, while for grey scale video at TV rate the input means 22 is a complex of conventional elements.

The power buses 18 are brought out at the bottom periphery of the panel and are here shown as connected to a common ground. The switching signal buses 20 are brought out the right hand side of the display panel and are connected to the vertical scan control means 30.

Figure 3:
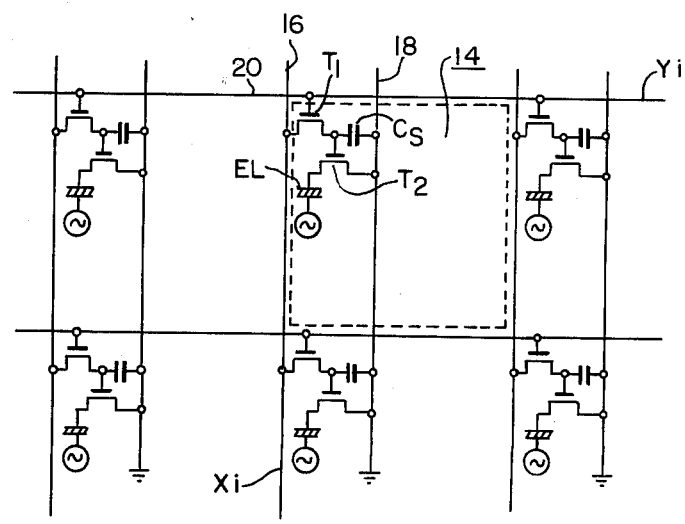
FIG. 3 is a schematic circuit representation of a small portion of the panel illustrating the repetitive circuit layout.
Figure 4:
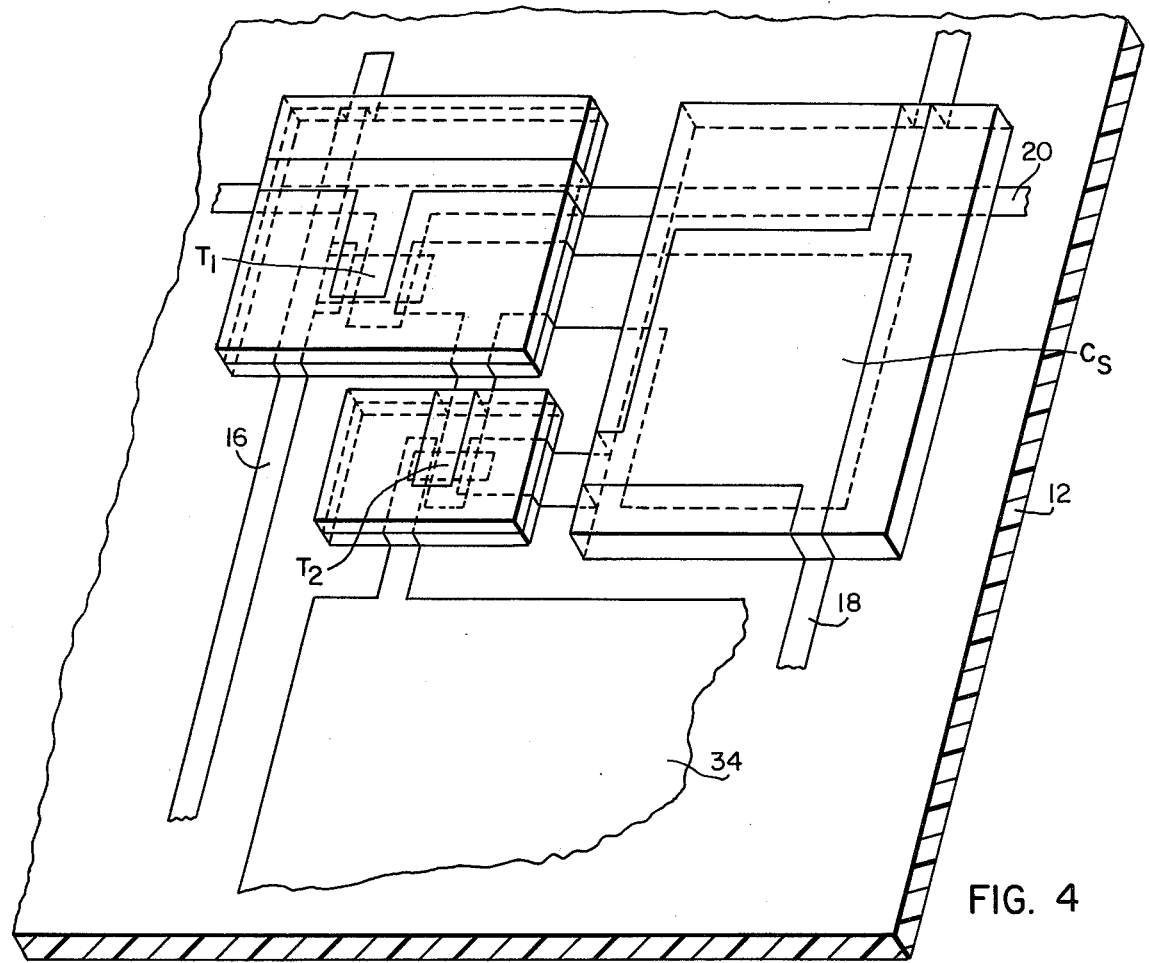
FIG. 4 is an illustrative perspective view of the circuit element layout for a single elementary circuit portion of the display panel.

The display panel 10 structure can be more readily appreciated by reference to FIGS. 2–4. The addressing thin film circuitry 32 is deposited at each display element upon the glass substrate 12 by vacuum depositing in sequence selected thin layers of semiconductive material, conductive drain, source, and gate electrodes, insulating material, conductive capacitor members, and electroluminescent electrode. The deposition sequence and arrangement of the deposits is such as to form the repetitive elemental circuit layout as seen in FIGS. 3 and 4, with the electrical elements being interconnected to each other and to the bus bars. The bus bars in fact are just overlapped conductive layers of adjacent elementary circuits. Also deposited on the substrate within the area defined by each unit cell defined by the intersection of the information bus 16, power bus 18, and switching bus 20 is a conductive electrode 34. An insulative layer 36 is disposed over each thin film circuitry array at each display element with openings provided in layer 36 over electrodes 34.

A relatively thick electroluminescent phosphor layer 38 covers the entire display panel area over the electrodes 34 and the insulative pads 36. The top surface of the electroluminescent phosphor layer 38 is planar and a thin semi-transparent conductive layer 40 is disposed atop the phosphor to serve as a common front electrode for the electroluminescent phosphor. A transmissive insulative faceplate 42 of glass may be provided over the common electrode for protection and to permit hermetic sealing of the display panel at the peripheral edges, with the faceplate 42 sealed to the substrate 12. The electroluminescent (EL) phosphor layer 38 may typically be about 0.7 mils thick, with a thin 0.2 mil sprayed methylmethacrylate film over the layer 38 to ensure a smooth top surface for deposition of the conductive thin electrode 40.

The elemental thin film circuit is seen in detail in FIGS. 3 and 4. The thin film switching transistor $T_1$ has its source connected to the information signal bus $X_i$ for the column of that particular display element. The gate of $T_1$ is connected to the switching signal bus $Y_j$ for the row of the particular display element. The drain of $T_1$ is connected to one side of capacitor $C_s$ and also to the gate of power transistor $T_2$. The other side of capacitor $C_s$ is connected to the power bus 18. The source of power transistor $T_2$ is also connected to the power bus 18. The drain of $T_2$ is connected to the lower conductive electrode 34 for the electroluminescent phosphor layer. The common top electrode layer 40 is connected to the high frequency power supply 28.

The thin film transistors $T_1$ and $T_2$ comprise thin layers of cadmium selenide semiconductive rectangular blocks with conductive source and drain contacts of indium-copper as described more fully in copending application Ser. No. 609,139, filed Aug. 29, 1975.

The bus bars and gate electrodes as well as the capacitor conductive members and the lower electrode for the electroluminescent material are all aluminum. The aluminum thickness depends on the conductor function, being typically about 600 Angstroms thick for low current uses, with all buses being about 3 mils wide. The aluminum layer for the power bus is about 1000 Angstroms thick. The capacitor conductors and the lower EL electrode are about 600 Angstroms thick. The top EL planar common electrode is lead oxide-gold composite. The electroluminescent phosphor layer is first smoothed with an organic surface coating and then lead oxide is laid down about 300 Angstroms thick, and gold laid down atop the lead oxide about 50 Angstroms thick.

It is essential to accurate operation of the display panel that the electroluminescent layer be excited only by the electrodes provided for this purpose. The top electrode is a common electrode and the excitation signal is applied between it and the bottom electrode 34 which is connected to the drain of the power transistor $T_2$. It is important that the entire thin film circuitry and the bus bars be well insulated from the electroluminescent phosphor layer to prevent unwanted phosphor excitation. A unique way of insulating the thin film circuitry has been devised which contributes to the ease of panel fabrication. At this stage of fabrication the panel is as seen in FIG. 4 with the thin film circuit elements $T_1$, $T_2$, $C_s$ interconnected by the buses 16, 18, 20. The lower electrode 34 for each display cell is deposited directly on the glass substrate and the circuit elements $T_1$, $T_2$, $C_s$ and portions of the buses are built up some distance from the substrate because of the successive layers of materials. The problem then is to effectively insulate the electrical components from the electroluminescent phosphor layer which must now be deposited, and at the same time ensure good contact of the phosphor layer with the bottom electrode 34. After the thin film circuitry 32 and lower electrode 34 are deposited upon the substrate 12, the partially fabricated panel has a laminated photoresist layer pressed over the circuitry and electrode. The laminated photoresist by way of example comprises "Riston", a DuPont trademarked material. The laminated photoresist is a three layer structure which is a carrier or support sheet of 1 mil thick polyester film, a layer of photoresist which is from 0.5 to 5 mils thick, and a cover-separator layer of 1 mil polyolefin. The unexposed photoresist is soft and plastic so that it is easily deformed into the uneven surface presented by the thin film circuitry. The polyolefin cover layer is peeled off and the photoresist is pressed over the entire panel with the planar carrier or support sheet facilitating this operation. The photoresist is laminated under pressure by heating to about 220° F. A photomask is used to expose the photoresist only over the thin film circuitry areas. The photoresist is negative acting and thus polymerizes under ultraviolet with the exposure time being several minutes. After exposure the protective polyester carrier sheet is removed. The unexposed area above the bottom electrode 34 is then removed by developing the panel in a 1,1,1-trichloroethane bath for several minutes. This leaves in place the polymerized photoresist as a thick insulator layer covering the thin film circuitry and conforming to the uneven surface of such circuitry.

The operation of the display panel will now be explained. A portion of the X-Y addressable TFT-EL matrix circuit is illustrated in FIG. 3. Transistor $T_1$ functions as a voltage-controlled "switch", the ON impedance of this switch being controlled by the potential applied to the gate bus bar $Y_j$. The drain electrode to $T_1$ is connected to bus bar $X_i$. The devices are biased such that $T_1$ conducts when positive potential is applied to the gate. Video information appearing at $X_i$ is then transferred to a storage capacitor $C_s$, located at $(X_i, Y_j)$, when $T_1$ conducts.

Transistor $T_2$ functions as a voltage-controlled "resistor", in that its impedance is determined by the potential stored on $C_s$. The value of this impedance determines the level of AC excitation appearing across the electroluminescent element, denoted $C_{EL}$.

A sketch of the elemental matrix circuit layout is illustrated in FIG. 4. The thin-film transistors which utilize CdSe as the semiconductor, along with the storage capacitor, metal interconnects, and bus bars are vacuum deposited. The electroluminescent layer is applied after the TFT matrix circuit is completed. Each active picture element occupies an area of approximately 40 mils × 40 mils located on 50 mil centers and the entire 6 inch × 6 inch panel contains an array of about 100 × 100 elements or more.

The addressing system shown is a line-at-a-time system. The contrast to normal "raster" type addressing in which each element in the display field is scanned in sequence at megahertz rates, line-at-a-time addressing permits the display of video information at conventional TV rates, but with only modest performance requirements imposed upon the TFT devices. With this method video signals (grey scale) for an entire line of display elements are first stored sequentially in an analog video register. The outputs of this register are supplied to the display panel on the vertical information buses $(X_i)$ and transferred to the corresponding element storage capacitors, all at one time, when a switching pulse on the selected horizontal bus $(Y_j)$ actuates all the element signal gates in that line. Introduction of the intermediate storage register relaxes the bandwidth requirements of the display element signal gates, as well as that of the information buses, by a factor approximately equal to the number of elements in a display line.

The vertical scan frequency may be 60 Hz and thus each horizontal line is then refreshed every 16.7 ms, corresponding to the field scan time in normal TV format. The analog video register cycle period is 127 $\mu$s; one half this period being allocated for entering sampled video information into the register and the other half for transferring the video levels to the storage capacitors in a given line on the display panel.

The following sequence of events describes the complete line-at-a-time addressing process:

1. Sample brightness information at a 2 MHz rate for 60 microseconds and enter in all 120 analog video register stages.
2. Disable sampling circuit and apply a 60 microsecond switching pulse on the corresponding horizontal bus ($Y_j$). This transfer stored potential levels from vertical information buses ($X_i$'3s) to the element storage capacitors ($C_{sj}$'s).
3. Sample brightness information for the next horizontal line and continue the sequence until the whole field is stored.

Returning to the circuit schematic associated with each element picture "point" is given in FIG. 3, the video storage capacitor $C_s$, connected between the gate and source of $T_2$, has a capacitance of 20 pf. At an excitation frequency of 10 kHz, the electroluminescent element can be modeled as a pure capacitance ($C_{EL}$) of value 8 pf. The parasitic capacitance, $C_p$, appearing in the drain circuit owing to gate overlap, etc. is approximately 0.1 pf. The power bus supplies a 150 volt peak-to-peak AC signal at 10 kHz to the panel. The electroluminescent phosphor exhibits increased brightness at increased applied voltage.

In simplest terms, the function of $T_1$ is to transfer the potential $V_x$ appearing at its drain electrode to the storage capacitor $C_s$, whenever the gate potential $V_y$ is positive. The potential $V_s$ stored in $C_s$ then controls the conduction level of $T_2$, which in turn modulates the effective AC potential across the electroluminescent layer.

The resultant AC component appearing across the electroluminescent layer is a complex function. It has been found that the grey scale is essentially only a function of the effective on resistance of $T_2$, while the on-off contrast ratio depends upon both the $T_2$ on resistance and the off-leakage current.

The display panel and its operation is more fully described in "A 6 × 6-in 20-lpi Electroluminescent Display Panel", published in IEEE Transactions on Electron Devices, Vol. ED-22, No. 9, September 1975. Operation of the display panel as an alpha-numeric display device is described therein in detail.

We claim:
1. An electroluminescent display panel comprising;
   a. a planar substrate;
   b. an array of spaced apart thin film transistor control circuitry disposed on the substrate;
   c. an orthogonal matrix of rows and columns of switching signal, information signal, and power bus bars disposed on the substrate interconnecting and defining an array of unit display cells, each unit display cell including an individual thin film transistor control circuit;
   d. a first electroluminescent electrode disposed on the substrate as part of each unit display cell and interconnected with the transistor control circuit;
   e. a relatively thick laminated polymerized in place photoresist insulator layer disposed over the thin film transistor control circuitry and over interconnecting bus bars but not over the first electroluminescent electrodes;
   f. a layer of electroluminescent material disposed over the entire area of the display panel over the insulator layer and in intimate contact with the individual first electroluminescent electrodes, which electroluminescent layer has a planar, smooth top surface;
   g. a light transmissive common electrode deposited atop the electroluminescent layer and in intimate contact therewith.

2. The electroluminescent display panel as specified in claim 1, wherein a light transmissive faceplate is provided over the light transmissive electrode.

3. The electroluminescent display panel as specified in claim 2, wherein the faceplate is peripherally hermetically sealed to the planar substrate.

4. The electroluminescent display panel as specified in claim 1, wherein the laminated photoresist insulator is substantially photopolymerized acrylate in a thickness of from about 0.5 mil to 5 mils.

* * * * *